United States Patent
Imoto

(10) Patent No.: US 7,497,535 B2
(45) Date of Patent: Mar. 3, 2009

(54) PRINT CONTROL APPARATUS, PRINT CONTROL METHOD THEREOF, CONTROL PROGRAM, PRINTER DRIVER, PRINTER, AND COMPUTER READABLE STORAGE MEDIUM

(75) Inventor: Takashi Imoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 11/476,556

(22) Filed: Jun. 29, 2006

(65) Prior Publication Data
US 2007/0008349 A1    Jan. 11, 2007

(30) Foreign Application Priority Data
Jul. 8, 2005    (JP)    ............................. 2005-200648

(51) Int. Cl.
*B41J 2/195*    (2006.01)
(52) U.S. Cl. .................................. 347/7; 347/5; 347/19
(58) Field of Classification Search ...................... 347/2, 347/3, 5, 7, 19, 86, 85
See application file for complete search history.

(56) References Cited

U.S. PATENT DOCUMENTS

| | | | |
|---|---|---|---|
| 6,113,208 A | * | 9/2000 | Benjamin et al. .............. 347/7 |
| 6,971,732 B1 | * | 12/2005 | Seshimo et al. .............. 347/19 |
| 7,048,350 B2 | | 5/2006 | Im et al. |

FOREIGN PATENT DOCUMENTS

| | | |
|---|---|---|
| CN | 1488508 | 4/2004 |
| JP | 3-2040 | 1/1991 |
| JP | 3-234679 | 10/1991 |
| JP | 2001-071541 | 3/2001 |

* cited by examiner

*Primary Examiner*—Lam S Nguyen
(74) *Attorney, Agent, or Firm*—Fitzpatrick, Cella, Harper & Scinto

(57) ABSTRACT

Information related to ink mounted to a printer that performs printing is acquired, and information for designating a type of ink that has been set to be used in printing by the printer is acquired. Based on the set type of ink and acquired information, it is determined whether or not the printer can print with a type of ink other than the set type of ink to be used. If it is determined that the printing is possible, displaying is executed to have a user confirm the set type of ink.

20 Claims, 6 Drawing Sheets

PRINT CONTROL APPARATUS, PRINT CONTROL METHOD THEREOF, CONTROL PROGRAM, PRINTER DRIVER, PRINTER, AND COMPUTER READABLE STORAGE MEDIUM

FIELD OF THE INVENTION

The present invention relates to a printer capable of printing with various types of ink incorporated therein, a print control apparatus and a control method thereof, a control program for controlling a printer, a printer driver, and a printer, and a computer readable storage medium.

BACKGROUND OF THE INVENTION

Conventionally, a printer capable of printing with plural colors of ink incorporated therein can perform printing with only a particular type of ink among the actually incorporated plural colors of ink in accordance with a setting of the printer or a printer driver. For instance, in a case where one of the plural colors of ink is exhausted, there is a known configuration for substituting the exhausted color ink with other color ink to perform printing (Japanese Patent Application Laid-Open No. 03-002040). Furthermore, in a case where black ink mounted to a printer is exhausted and there is no preliminary black ink, Japanese Patent Application Laid-Open No. 03-234679 discloses a technique of printing a black image portion with black color realized by mixture of other colors of ink in order to achieve a minimal print result.

In general, a printer and a printer driver are designed to use all types of ink mounted to the printer to achieve the most appropriate print result. Therefore, they are not designed to perform printing with particular ink only. In other words, printing with particular ink only is strictly urgent evasive printing, and a printout obtained by such printing has minimum visible quality. When the exhausted ink is filled, it is necessary to restore the setting of ink to be used in order to perform printing with the refilled ink.

However, after ink has been filled, a user sometimes forgets to restore the setting of ink to be used before printing. In this case, a user cannot achieve a satisfactory printout, wasting the ink and media. In order to avoid such problem, in a case where printing is performed with particular type of ink only, it is proposed to display warning to a user to confirm, at every printing job, the user's intention of such printing. However, even in a case where the user performs printing intentionally with a particular type of ink only, the warning is displayed each time printing is performed, being intrusive to the user.

SUMMARY OF THE INVENTION

The object of the present invention is to solve the above-described disadvantage of the conventional art.

According to the feature of the present invention, in a case where a print setting is made to perform printing with only part of the types of ink mounted to a printer, the invention provides a print control apparatus and a control method thereof, as well as a printer driver and a printer, which confirm a user about the print setting only if there is a possibility that the print setting is erroneous, or only when the user-intended print setting should be changed.

According to the present invention, there is provided a computer readable storage medium for storing a control program of controlling a printer to be controlled in an information processing apparatus connected to the printer, the storage medium comprising:

an acquisition step module for acquiring information related to ink incorporated in the printer to be controlled;

an ink-type setting step module for setting information for designating a type of ink to be used upon printing using the printer;

a determination step module for determining whether or not the printer can print using a type of ink other than the type of ink designated by the information set by the acquisition step module, based on the information acquired by the acquisition step module; and a confirmation display step module for displaying to have a user confirm the type of ink to be used set by the ink-type setting step module, in a case where it is determined by the determination step module that the printing is possible.

According to the present invention, there is provided a print control apparatus comprising:

an acquisition unit configured to acquire information related to ink incorporated in a printer to be controlled;

an ink-type setting unit configured to set information for designating a type of ink to be used upon printing using the printer;

a print data generation unit configured to input image data and generate print data corresponding to the type of ink set by the ink-type setting unit;

a determination unit configured to determine whether or not the printer can print with a type of ink other than the type of ink set by the ink-type setting unit, based on the information acquired by the acquisition unit; and a confirmation display control unit configured to display to have a user confirm the type of ink set by the ink-type setting unit, in a case where it is determined by the determination unit that the printing is possible.

Note that the summary of the invention does not list all features of the present invention. Other features described in the claims and a combination of the features can constitute the present invention.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF PREFERRED EMBODIMENT

Hereinafter, a preferred embodiment of the present invention is described in detail in accordance with the accompanying drawings. Note that the embodiment which will be described below does not limit the invention specified in the claims, and not all the combinations of the features described in the embodiment are necessarily essential to problem-solving means according to the present invention.

Figure 1:
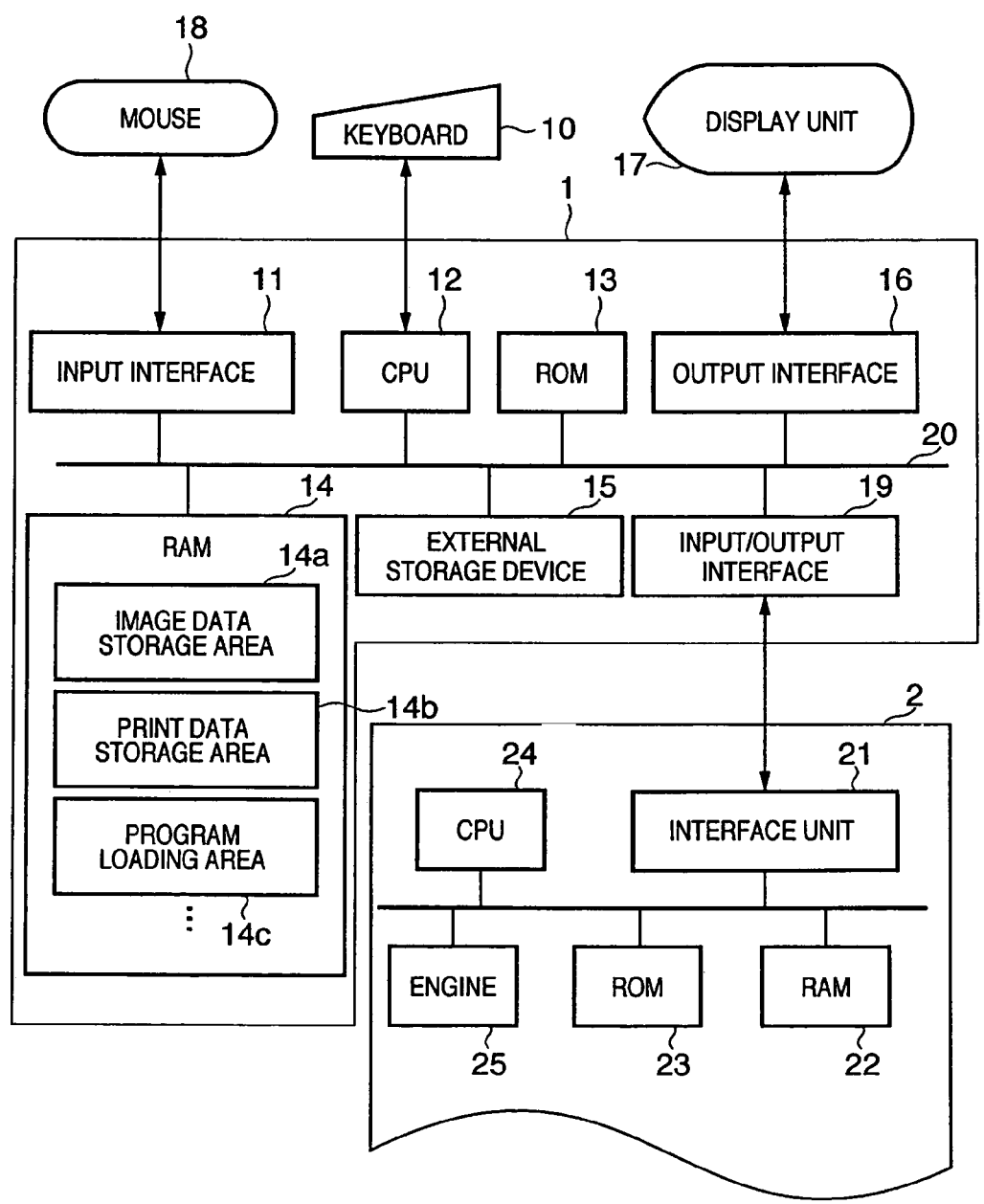
FIG. 1 is a block diagram describing a configuration of a print system according to an embodiment of the present invention.

FIG. 1 is a block diagram describing a configuration of a print system according to an embodiment of the present invention. Herein, a host computer 1 is connected to a printer 2 through communication means such as a network.

Figure 2:
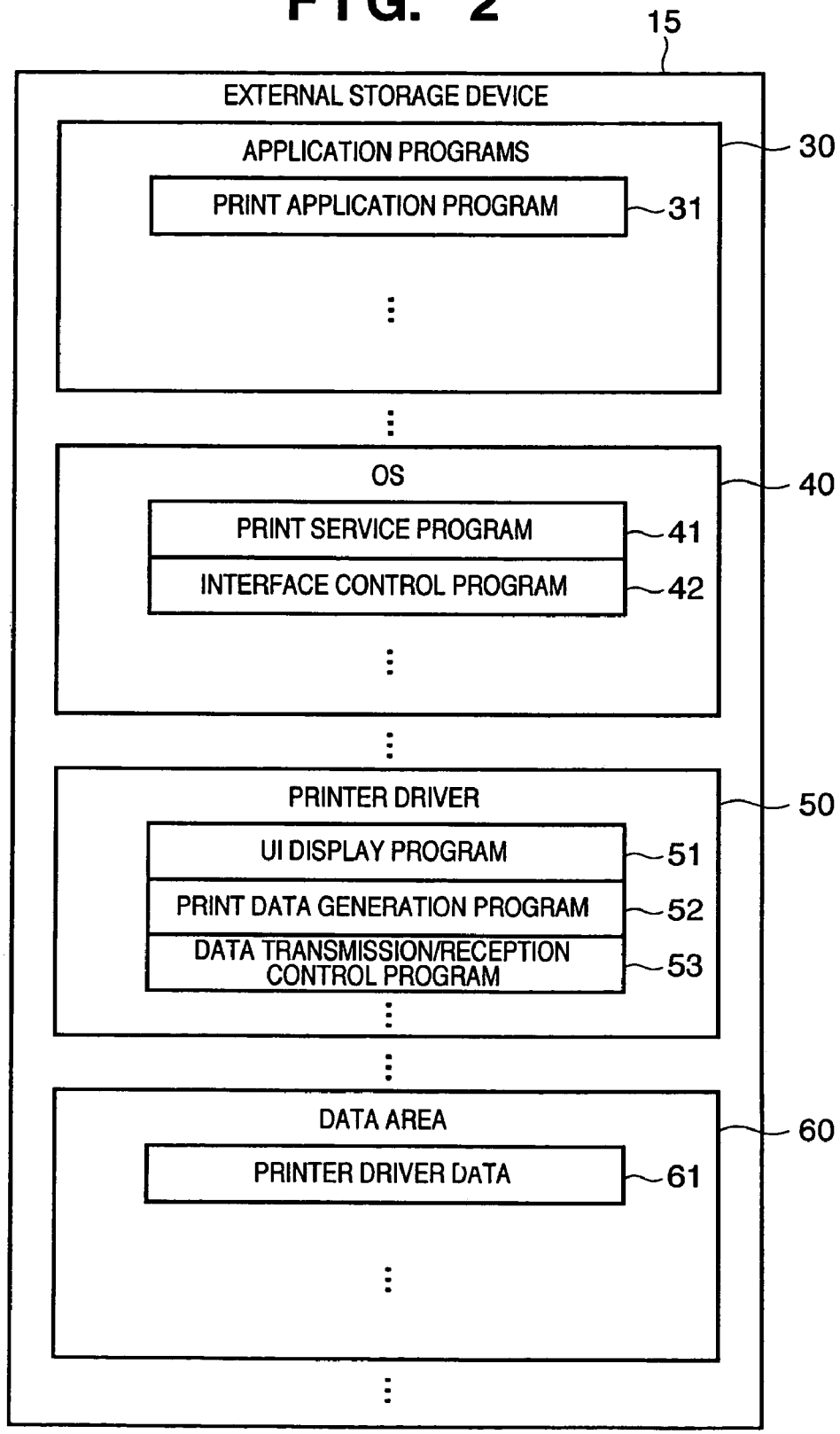
FIG. 2 depicts an explanatory view of a data construction stored in an external storage device of a host computer according to the embodiment.

The host computer 1 comprises: an input interface 11, a CPU 12, ROM 13, RAM 14, an external storage device 15, an output interface 16, a display unit 17, a keyboard 10, a mouse 18, and an input/output interface 19. The input interface 11 connects the keyboard 10 with the mouse 18, and outputs data which is inputted with the keyboard 10 and the mouse 18 to a bus 20. The ROM 13 stores an initialization program. The external storage device 15 stores application programs 30, an operating system (OS) 40, and a printer driver 50, and includes a data area 60 for storing various data, as shown in FIG. 2. The RAM 14 includes: an image data storage area 14a, a print data storage area 14b, a program loading area 14c and the like. When application execution is designated by the keyboard 10 or the mouse 18, the corresponding program and driver are loaded from the external storage device 15 to the program loading area 14c of the RAM 14 and executed under the control of the CPU 12. The output interface 16 outputs display data to the display unit 17, and controls data displaying of the display unit 17. The input/output interface 19 controls the interface between the printer 2 and the host computer 1.

Next, the construction of the printer 2 is described.

The printer 2 comprises: an interface unit 21, RAM 22, ROM 23, a CPU 24, and a printer engine 25. The interface unit 21 is connected to the input/output interface 19 of the computer 1. For this interface, Centronics parallel interface, USB, SCSI, IEEE 1394 and the like may be employed. Further, to the input/output interface 19, an expansion option is connected to expand the function of the printer 2.

The ROM 23 stores a control program of the printer. The CPU 24 controls respective units of the printer 2 in accordance with the control program stored in the ROM 23. The RAM 22 is used as a work memory and main memory of the CPU 24, and has a reception buffer to temporarily store received data. The printer engine 25 performs printing based on data stored in the RAM 22.

FIG. 2 depicts an explanatory view of a data construction stored in the external storage device 15 of the host computer 1 according to the present embodiment.

As mentioned above, the external storage device 15 stores the application programs 30, the OS 40, and the printer driver 50. In the application programs 30, various application programs are included. Among them is a print application program 31 for allowing a user to generate print data and command a print start.

The OS 40 includes various service programs provided by the OS. The service programs include: a print service program 41 that provides an environment for printing, an interface control program 42, and so on. The interface control program 42 controls a physical I/O port, and reads or writes data through the Centronics parallel interface or the like.

The printer driver 50 includes: a UI display program 51, a print data generation program 52, a data transmission/reception control program 53, and the like. The UI display program 51 informs a user of a print setting such as a print method, a print medium and the like, and provides a user with print setting changing means. With the use of the UI display program 51, the type of ink to be used in printing can be designated. Furthermore, the UI display program 51 informs the print application program 31 of a print setting set by the user. The print data generation program 52 is started by the print service program 41 when printing is executed by the print application program 31. Based on the print setting set by the UI display program 51, the print data generation program 52 converts the image data which is generated by the print application program 31 to printer commands. For instance, in a case of printing an image with a particular type of ink only, the print data generation program 52 converts data to printer commands reflecting this setting.

The data transmission/reception control program 53 performs bidirectional communication with the printer 2 through the interface control program 42. The data transmission/reception control program 53 receives from the print service program 41 the print data generated by the print data generation program 52, and transmits the print data to the printer 2 through the interface control program 42. Further, the data transmission/reception control program 53 acquires a printing state of the printer 2, status information such as errors, ink information and so on through the interface control program 42.

The data area 60 stores various application programs, and data such as files used in the OS or the like. Printer driver data 61 used by the printer driver 50 is stored in the data area 60. Note that although the processing share of the host computer 1 is described above as an example, the sharing pattern is not particularly limited to the above-described form but may be other sharing patterns. Furthermore, part of these processes may be executed by the printer 2.

Described next is a particular-ink-usage warning indication used at the time of printing by an inkjet printer which is capable of mounting both black ink and color ink.

Figure 3:
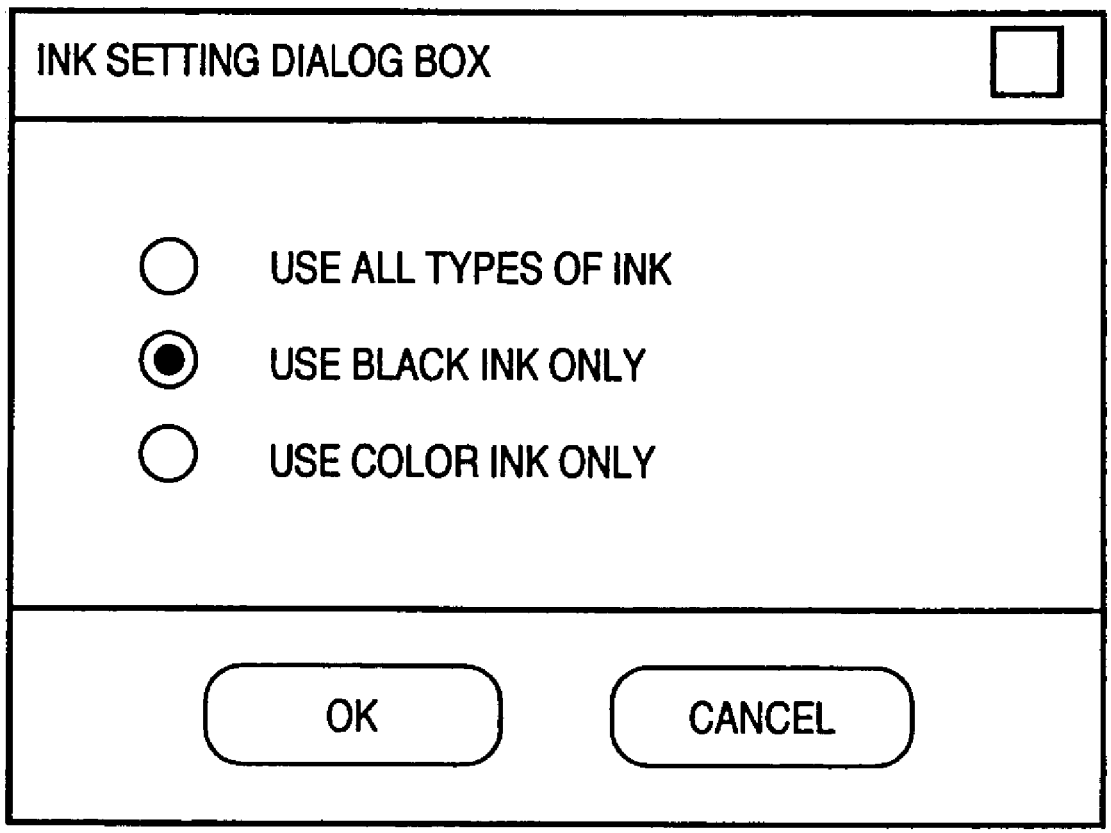
FIG. 3 depicts an example of a dialog box for setting a type of ink to be used in a printer according to the embodiment.

FIG. 3 shows an example of a dialog box for setting a type of ink to be used in the printer 2. The dialog box is displayed under the control of the UI display program 51 of the printer driver 50.

First, a user decides ink to be used in the printer 2 through the ink setting dialog box. The printer 2 according to the present embodiment is a printer capable of separately mounting black ink and color ink. Therefore, three items are displayed in the ink setting dialog box as follows: "use all types of ink"; "use black ink only"; and "use color ink only". The UI display program 51 stores the item, which is designated by the user in the ink setting dialog box, in the printer driver data area 61 along with other print settings.

Thereafter, when printing is started by the print application program 31, the print service program 41 starts the print processing. The print service program 41 transfers the image data generated by the print application program 31 as well as all the print settings, which are stored by the UI display program 51 in the printer driver data area 61, to the print data generation program 52. The print data generation program 52 converts the received image data to printer commands based on the print settings. If the ink setting is set to "use all types of ink", the print data generation program 52 generates print data to achieve the most appropriate print result as usual. Meanwhile, if the ink setting is set to "use black ink only", color data is converted to monochrome data to generate print data. If the ink setting is set to "use color ink only", black data is converted to synthetic black data formed with color ink to generate print data.

Figure 4:
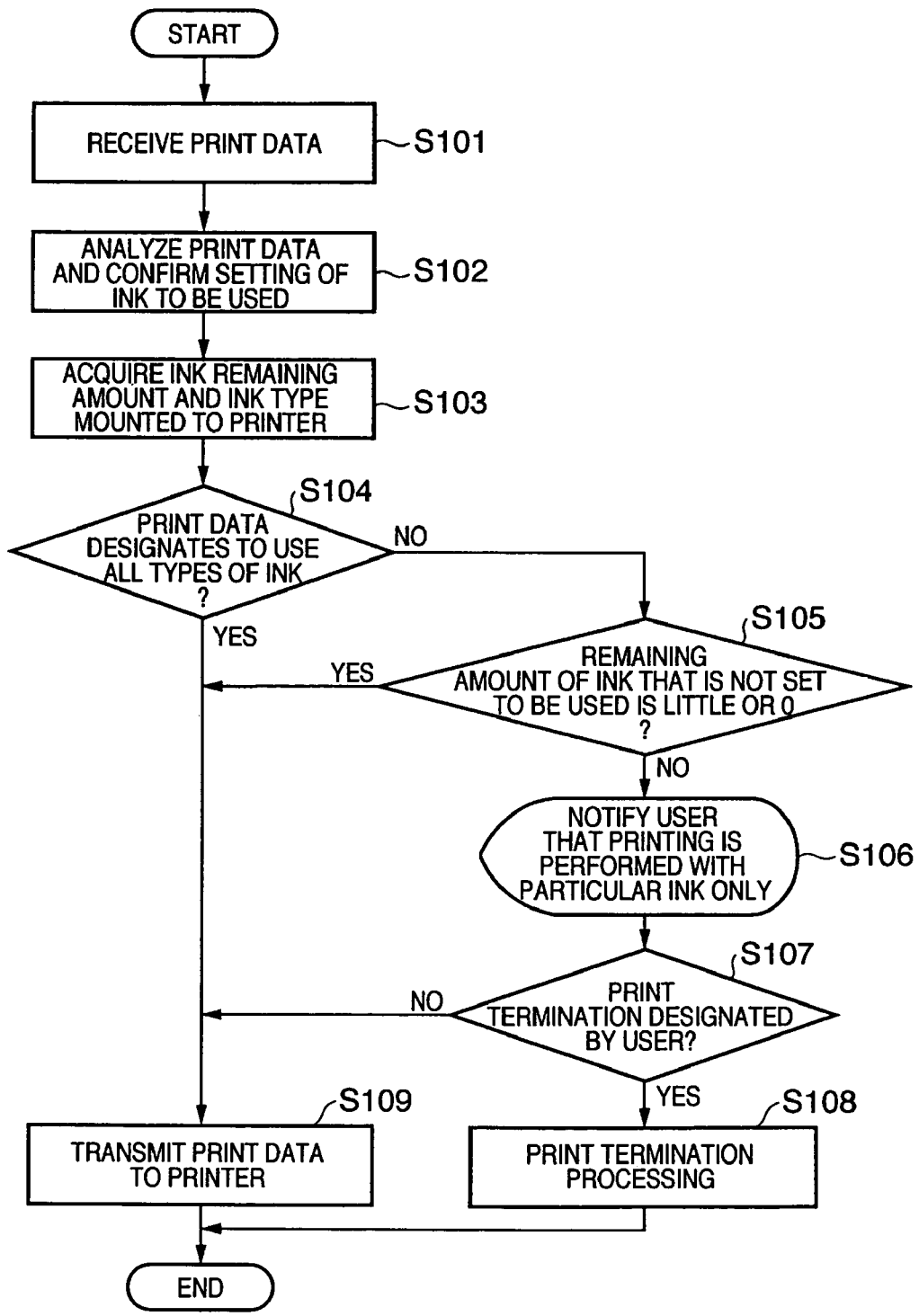
FIG. 4 is a flowchart describing a print procedure executed by a data transmission/reception control program of a printer driver according to the embodiment.

FIG. 4 is a flowchart describing a print procedure executed by the data transmission/reception control program 53 of the printer driver 50 according to the present embodiment. This procedure is executed to confirm a user of the consistency between the "ink to be used" set in the print data, and the type of ink as well as the remaining amount of ink actually mounted to the printer 2. The confirmation to the user is made when the print data generated by the print data generation program 52 is transmitted to the printer 2.

First, in step S101, print data generated by the print data generation program 52 is transferred to the data transmission/reception control program 53 by the print service program 41. In step S102, the print data is analyzed to confirm the setting of ink to be used in printing the data. In step S103, status information of the printer 2, including the remaining amount of ink and the type of ink mounted to the printer 2, is acquired from the printer 2 by the interface control program 42. Note that this step S103 may be executed before step S101.

In step S104, it is determined whether or not the ink setting, which has been analyzed in step S102, indicates to "use all types of ink". If so, the control proceeds to step S109 since there is no necessity to display waning to the user. In step S109, the print data received in step S101 is transmitted to the printer 2.

Meanwhile, in step S104, if the ink setting indicates to "use black ink only" or "color ink only", the control proceeds to step S105. In step S105, the remaining amount of ink, which is not set to be used in the ink setting, is confirmed based on the information acquired in step S103. More specifically, if the ink setting indicates to "use black ink only", the remaining amount of color ink is confirmed. If the ink setting indicates to "use color ink only", the remaining amount of black ink is confirmed.

Normally, when printing is performed with only a particular type of ink and not using all types of ink mounted to the printer 2, for instance, when printing is performed with black ink only and not using color ink, it can be considered that the remaining amount of color ink is little. Therefore, if the remaining amount of ink, which is not set to be used, is none or little, it can be assumed that the user is intentionally using the particular type of ink only. In other words, if the remaining amount of ink which is not set to be used is "little" or "0" in step S105, the control proceeds to step S109 to perform printing.

Figure 5:
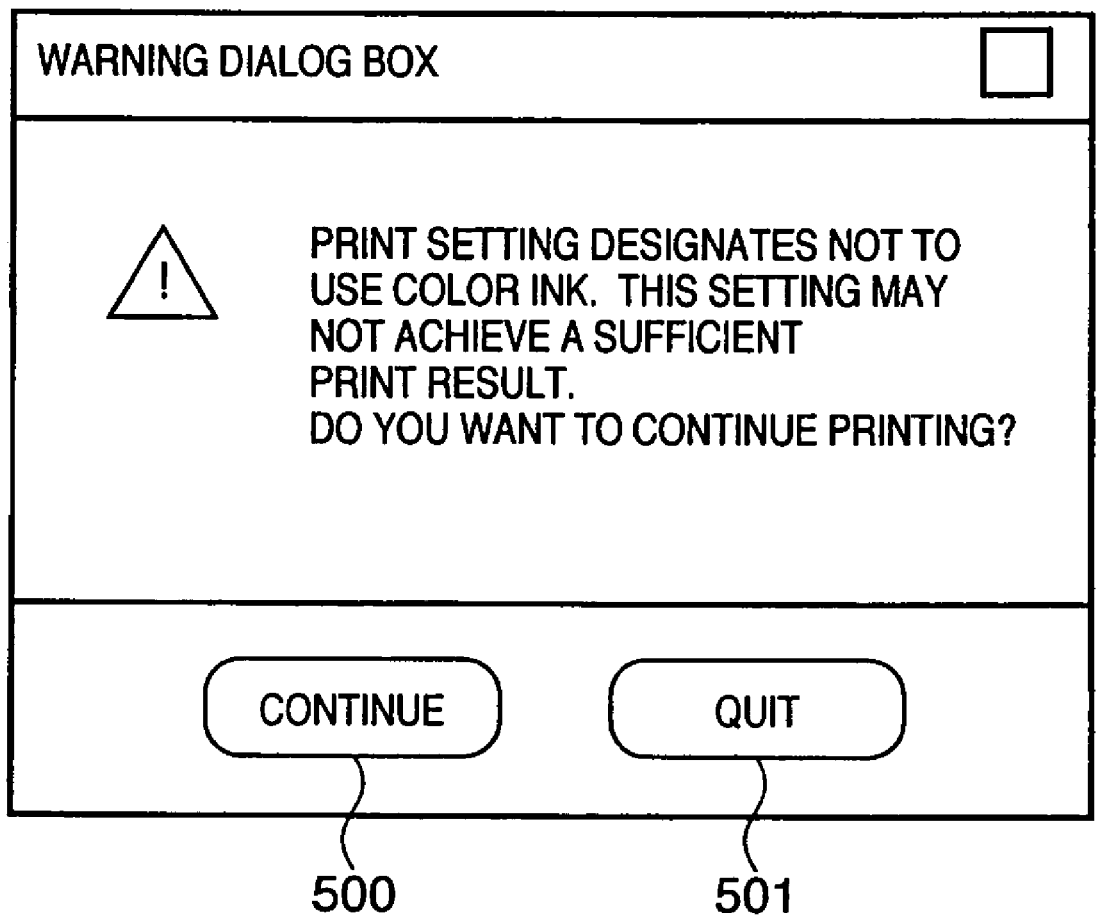
FIG. 5 depicts an example of a warning dialog box for letting a user confirm the setting of the type of ink to be used.

Meanwhile, if the remaining amount of ink which is not set to be used is not "little" or "0" in step S105, the control proceeds to step S106. In other words, the remaining amount of ink, which is not set to be used in the ink setting, is more than a certain level. Therefore, the control proceeds to step S106, determining that the user is about to perform printing without noticing an error in the print setting. Note that the state the control advances from step S105 to S106 can either be the case where the print setting is intended by the user, or the case where it is preferable to change the print setting. In step S106, a warning dialog box such as that shown in FIG. 5 is displayed on the display unit 17. Then in step S107, the control waits for a user's selection operation.

FIG. 5 shows an example of a warning dialog box for letting a user confirm the setting of the type of ink to be used.

This example shows a case where the print setting designates to "use black ink only" despite that there is still remaining amount of color ink. FIG. 5 shows an example of displaying a message, saying "Print setting designates not to use color ink. This setting may not achieve a sufficient print result. Do you want to continue printing?" Along with the message, a continue button 500 and a quit button 501 are displayed.

If the user selects the continue button 500, the control proceeds from step S107 to S109, and the print data is transmitted to the printer 2 to perform printing with the designated particular type of ink only (for example, black ink in the example of FIG. 5). Meanwhile, if the user selects the quit button 501, the control proceeds to step S108, and the control ends without transmitting the print data to the printer 2.

For a case where the user intentionally performs print setting to use color ink only, a case of no black ink is assumed. In this case, for instance, when a new black ink cartridge is mounted, the print setting must be reset to "use all types of ink". However, if the user forgets to restore the setting, printing with color ink only is unintentionally continued despite the remaining black ink. However, according to the above-described configuration, when there is a remaining amount of black ink, a message regarding the print setting is displayed to alert the user to change the print setting to "use all types of ink". Note that the newly mounted ink cartridge is not limited to a brand-new ink cartridge that is newly bought by a user, but may be a half-used ink cartridge that has remaining ink, which is used in another printer of the same model.

The flowchart in FIG. 4 is described on the procedure for a case where print data is generated by the print data generation program 52 of the printer driver 50, and thereafter transferred to the printer 2 by the data transmission/reception control program 53.

The similar warning displaying is possible also when print data is generated by the print data generation program 52 of the printer driver 50 upon receiving image data from an application program. Hereinafter, a procedure in this case is described.

Figure 6:
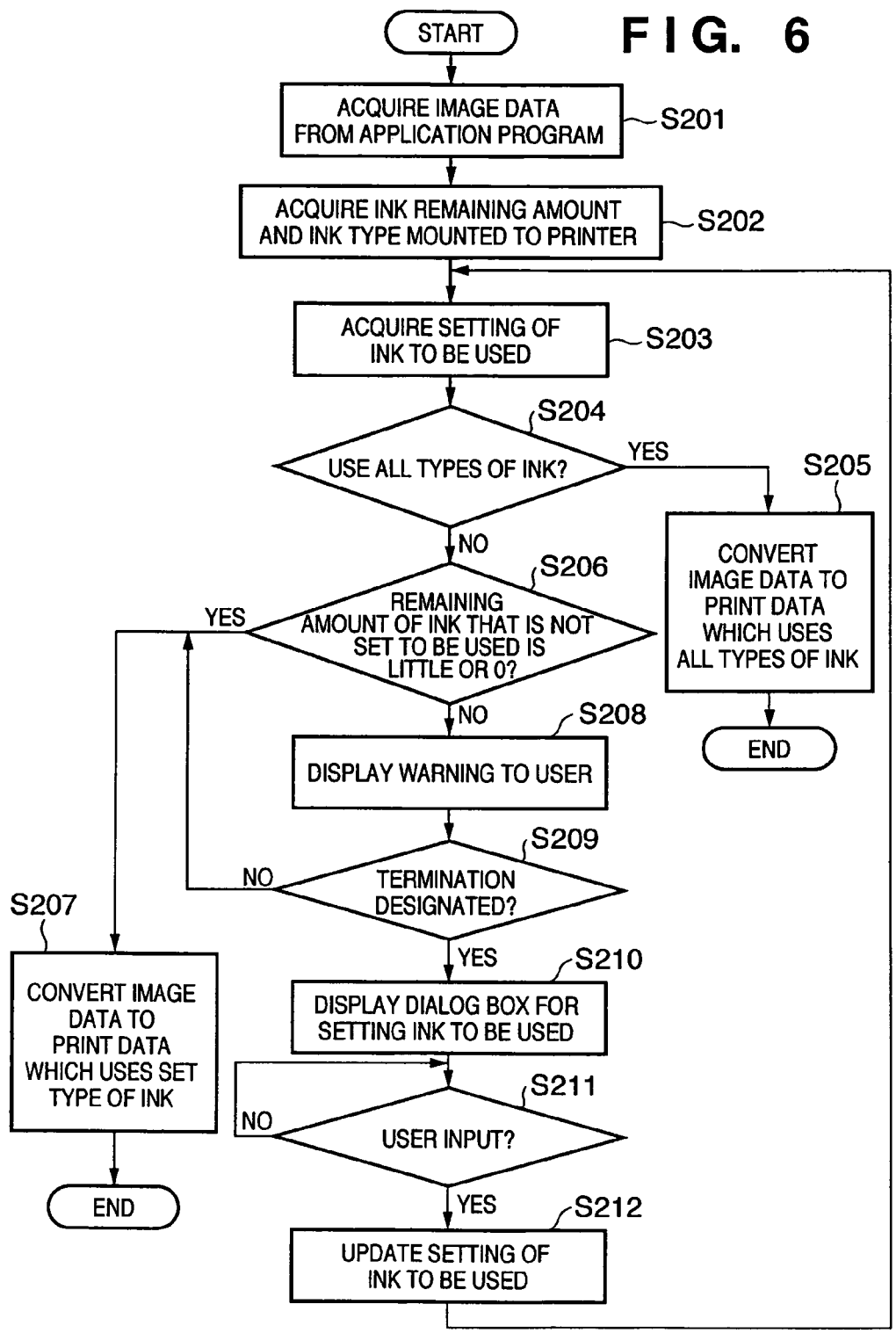
FIG. 6 is a flowchart describing a print data generation procedure executed by a print data generation program of a printer driver according to the embodiment.

FIG. 6 is a flowchart describing the procedure of generating print data by the print data generation program 52 of the printer driver 50 according to the present embodiment. This procedure is executed to confirm a user of the consistency between the "ink to be used" set in the image data, and the type of ink as well as the remaining amount of ink actually mounted to the printer 2. This procedure is performed when print data is generated based on the image data received by the application program 31.

First, in step S201, image data generated by the print application program 31 is received. In step S202, status information of the printer 2, including the remaining amount of ink and the type of ink mounted to the printer 2, is acquired from the printer 2 by the interface control program 42. Note that this step S202 may be executed before step S201. In step S203, the setting of ink to be used, which has been set with the use of the aforementioned dialog shown in FIG. 3, is acquired. In step S204, it is determined whether or not the ink setting indicates to "use all types of ink". If so, the control proceeds to step S205 since there is no necessity to display warning to the user. In step S205, the image data acquired in step S201 is converted to print data to perform printing with all types of ink, and the control ends.

Meanwhile, in step S204, if the ink setting does not indicate to "use all types of ink", that is, "use black ink only" or "color ink only", the control proceeds to step S206. In step S206, the remaining amount of ink, which is not set to be used in the ink setting, is confirmed based on the information regarding ink acquired in step S202. More specifically, if the ink setting indicates to "use black ink only", the remaining amount of color ink is confirmed. If the ink setting indicates to "use color ink only", the remaining amount of black ink is confirmed.

Normally, when printing is performed with only a particular type of ink and not using all types of ink, for instance, when printing is performed with black ink only and not using color ink, it can be considered that the remaining amount of color ink is little. Therefore, if the remaining amount of ink, which is not set to be used, is none or little, i.e., if the remaining amount of ink which is not used is "little" or "0", it can be assumed that the user is intentionally using the particular type of ink only. Therefore, if the remaining amount of ink which is not set to be used is "little" or "0" in step S206, the control proceeds to step S207. In step S207, the image data acquired in step S201 is converted to print data to perform printing with the designated particular type of ink, and the control ends.

Meanwhile, if the remaining amount of ink which is not set to be used is not "little" or "0" in step S206, it can be determined that the user is about to perform printing without noticing an error in the ink setting. Therefore, the control proceeds to step S208, and a warning dialog box corresponding to FIG. 5 is displayed on the display unit 17, as similar to aforementioned step S106 in FIG. 4. Then in step S209, the control waits for a user's selection operation.

If the user selects the continue button 500, the control proceeds from step S209 to S207, and print data using the designated particular type of ink only is generated. Meanwhile, if the user selects the quit button 501 in step S209, the control proceeds to step S210, and the "dialog box for setting the type of ink to be used" shown in FIG. 3 is again displayed on the display unit 17. Then in step S211, the control waits for a user's ink setting operation. When ink to be used is set, the control proceeds to step S212, and the information regarding ink to be used, which is set in the dialog box in FIG. 3, is stored in the printer driver data area 61. Then, the control proceeds to step S203, and the aforementioned processing is executed in accordance with the updated setting information regarding ink to be used.

Note, when "print termination" is designated in step S209, print processing may be terminated and the control may end as similar to the above-described flowchart in FIG. 4. Contrary, when "print termination" is designated in step S107 in FIG. 4, steps S210 to S212 in FIG. 6 may be executed before the control proceeds to step S104.

By virtue of the above process, a user is able to confirm, at the stage of developing print data, the ink setting based on the setting of ink to be used in the print data and the state of ink actually mounted to the printer. Accordingly, it is possible to avoid the problem of generating and printing unintentional print data.

Note that the display example in FIG. 5 shows a case where the print setting designates to "use black ink only" despite that there is a remaining amount of color ink. However, the above example describes a case where the print setting designates to "use color ink only" despite that there is a remaining amount of black ink. Therefore, the message to be displayed in FIG. 5 will be as follows: "print setting designates not to use black ink. This setting may not achieve a sufficient print result. Do you want to continue printing?" Also, the continue button 500 and the quit button 501 are displayed as similar to the above-described example in FIG. 5.

Further, although the above embodiment has described a case of using color ink and black ink, the present invention is not limited to this. For instance, the present invention is applicable to an apparatus which employs color ink having a lower print density than normally used density. More specifically, the present invention is applicable to a printer capable of mounting an ink cartridge, such as pale magenta (m), pale cyan (c) and the like, in addition to normal yellow (Y), magenta (M), and cyan (C). In a case where such printer is capable of setting the printer to use YMC only or YMmCc, the message displaying may be controlled based on the remaining amount of ink.

As has been set forth above, according to the present embodiment, in a case where a print setting designates to use a particular type of ink only, that is, in a case where the print setting designates not to use all types of ink mounted to the printer, warning is given and confirmation of the print setting is made to the user only if there is a sufficient amount of remaining ink that is not used in the printing. By virtue of this configuration, it is possible to prevent a user from printing with an erroneous ink setting, with less warning.

Note that although the above embodiment has been described, as a procedure executed by a printer driver installed in a host computer, the present invention is not limited to this, but for instance, the printer 2 may comprise this function. In this case, the printer 2 may include a display unit for displaying a UI screen shown in FIG. 3 or 5, and an operation unit having switches and buttons for selecting a desired item on the UI screen. Alternatively, a touch-panel display unit integrating a display unit and an operation unit may be employed.

Note that the present invention includes a case where the functions of the above-described embodiment are achieved by directly or remotely supplying a software program realizing the functions to a computer system or apparatus, then reading the supplied program codes by a computer of the system or apparatus, and executing the program codes. In this case, as long as it functions as a program, the form is not limited to a program. Therefore, the program codes themselves which are installed in a computer to realize the functions of the present invention using the computer also constitute the invention. In other words, the present invention includes a computer program itself for realizing the functions of the present invention. In this case, as long as it functions as a program, the form of program may be of object codes, a program executed by an interpreter, script data supplied to an OS, or the like.

For a storage medium supplying the program, for instance, a floppy (registered trademark) disk, a hard disk, an optical disk, a magneto-optical disk, MO, CD-ROM, CD-R, CD-RW, a magnetic tape, a non-volatile memory card, ROM, DVD (DVD-ROM, DVD-R) and the like can be used.

The present invention is not limited to the above embodiment and various changes and modifications can be made thereto within the spirit and scope of the present invention. Therefore, to apprise the public of the scope of the present invention, the following claims are made.

This application claims the benefit of Japanese Application No. 2005-200648, filed Jul. 8, 2005, which is hereby incorporated by reference herein in its entirety.

What is claimed is:

1. A computer readable storage medium for storing a control program of controlling a printer to be controlled by an information processing apparatus connected to the printer, said storage medium comprising:
   an acquisition step module for acquiring information related to ink incorporated in the printer to be controlled;
   an ink-type setting step module for setting information for designating a type of ink to be used upon printing using the printer;
   a determination step module for determining whether or not the printer can print using a type of ink other than the type of ink designated by the information set by said ink-type setting step module, based on the information acquired by said acquisition step module; and
   a confirmation display step module for displaying to have a user confirm the type of ink to be used set by said ink-type setting step module, in a case where it is determined by said determination step module that the printing is possible.

2. The storage medium according to claim 1, wherein the information related to ink acquired by said acquisition step module includes information on a type of ink incorporated in the printer and a remaining amount of each type of ink.

3. The storage medium according to claim 1, wherein said confirmation display step module displays a screen for having a user confirm whether or not printing is to be performed with ink other than the type of ink set by said ink-type setting step module.

4. The storage medium according to claim 1, further executing an ink re-setting step module for causing to re-set a type of ink in accordance with a user's response to said confirmation display step module.

5. A control program embodied in a computer-readable medium for controlling a printer to be controlled by an information processing apparatus connected to the printer, said program comprising:
   an acquisition step of acquiring information related to ink incorporated in the printer to be controlled;
   an ink-type setting step of setting information for designating a type of ink to be used upon printing using the printer;
   a print data generation step of inputting image data and generating print data corresponding to the type of ink set in said ink-type setting step;
   a determination step of determining whether or not the printer can print with a type of ink other than the type of ink set in said ink-type setting step, based on the information acquired in said acquisition step; and
   a confirmation display step of displaying to have a user confirm the type of ink set in said ink-type setting step, in a case where it is determined in said determination step that the printing is possible.

6. The control program according to claim 5, wherein the information related to ink acquired in said acquisition step includes information on a type of ink incorporated in the printer and a remaining amount of each type of ink.

7. The control program according to claim 5, wherein said confirmation display step displays a screen for having a user confirm whether or not printing is to be performed with ink other than the type of ink set in said ink-type setting step.

8. The control program according to claim 5, further comprising an ink re-setting step of causing to re-set a type of ink in accordance with a user's response to said confirmation display step.

9. A print control apparatus comprising:
   an acquisition unit configured to acquire information related to ink incorporated in a printer to be controlled;
   an ink-type setting unit configured to set information for designating a type of ink used in print data to be printed using the printer;
   a determination unit configured to determine whether or not the printer can print with a type of ink other than the type of ink set by said ink-type setting unit, based on the information acquired by said acquisition unit; and
   a confirmation display control unit configured to display to have a user confirm the type of ink set by said ink-type setting unit, in a case where it is determined by said determination unit that the printing is possible.

10. The print control apparatus according to claim 9, wherein the information related to ink includes information on a type of ink incorporated in the printer and a remaining amount of each type of ink.

11. The print control apparatus according to claim 9, wherein said confirmation display control unit displays a screen for having a user confirm whether or not the printing is to be performed with a type of ink other than the type of ink set by said ink-type setting unit.

12. The print control apparatus according to claim 9, further comprising an ink re-setting unit configured to cause said ink-type setting unit to re-set a type of ink in accordance with a user's response to said confirmation display control unit.

13. A print control apparatus comprising:
   an acquisition unit configured to acquire information related to ink incorporated in a printer to be controlled;
   an ink-type setting unit configured to set information for designating a type of ink to be used upon printing using the printer;
   a print data generation unit configured to input image data and generate print data corresponding to the type of ink set by said ink-type setting unit;
   a determination unit configured to determine whether or not the printer can print with a type of ink other than the type of ink set by said ink-type setting unit, based on the information acquired by said acquisition unit; and
   a confirmation display control unit configured to display to have a user confirm the type of ink set by said ink-type setting unit, in a case where it is determined by said determination unit that the printing is possible.

14. The print control apparatus according to claim 13, wherein the information related to ink includes information on a type of ink incorporated in the printer and a remaining amount of each type of ink.

15. The print control apparatus according to claim 13, wherein said confirmation display control unit displays a screen for having a user confirm whether or not the printing is to be performed with a type of ink other than the type of ink set by said ink-type setting unit.

16. The print control apparatus according to claim 13, further comprising an ink re-setting unit configured to cause said ink-type setting unit to re-set a type of ink in accordance with a user's response to said confirmation display control unit.

17. A print control method comprising:
   an acquisition step of acquiring information related to ink incorporated in a printer to be controlled;
   an ink-type setting step of setting information for designating a type of ink to be used upon printing using the printer;
   a determination step of determining whether or not the printer can print with a type of ink other than the type of ink set in said ink-type setting step, based on the information acquired in said acquisition step; and
   a confirmation display control step of displaying to have a user confirm the type of ink set in said ink-type setting step, in a case where it is determined in said determination step that the printing is possible.

18. A print control method comprising:
   an acquisition step of acquiring information related to ink incorporated in a printer to be controlled;
   an ink-type setting step of setting information for designating a type of ink to be used upon printing using the printer;
   a print data generation step of inputting image data and generating print data corresponding to the type of ink set in said ink-type setting step;
   a determination step of determining whether or not the printer can print with a type of ink other than the type of ink set in said ink-type setting step, based on the information acquired in said acquisition step; and
   a confirmation display control step of displaying to have a user confirm the type of ink set in said ink-type setting step, in a case where it is determined in said determination step that the printing is possible.

19. A printer capable of printing with plural types of incorporated ink, comprising:
- an acquisition unit configured to acquire information related to incorporated ink;
- an ink-type setting unit configured to set information for designating a type of ink used upon printing print data that is inputted;
- a determination unit configured to determine whether or not it is possible to perform printing with a type of ink other than the type of ink set by said ink-type setting unit, based on the information acquired by said acquisition unit; and
- a confirmation display control unit configured to display to have a user confirm the type of ink set by said ink-type setting unit, in a case where said determination unit determines that the printing is possible.

20. A printer driver comprising:
- acquisition means for acquiring information related to ink incorporated in a printer that performs printing;
- ink-type setting means for setting information for designating a type of ink used upon printing using the printer;
- determination means for determining whether or not the printer can print with a type of ink other than the type of ink set by said ink-type setting means, based on the information acquired by said acquisition means; and
- confirmation display control means for displaying to have a user confirm the type of ink set by said ink-type setting means, in a case where said determination means determines that the printing is possible.

* * * * *